United States Patent
Sameer

(10) Patent No.: US 11,164,031 B2
(45) Date of Patent: *Nov. 2, 2021

(54) SYSTEM AND METHOD FOR ANALYZING AN IMAGE OF A VEHICLE

(71) Applicant: HERE GLOBAL B.V., Eindhoven (NL)

(72) Inventor: Priyank Sameer, East Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,001

(22) Filed: Jul. 2, 2020

(65) Prior Publication Data

US 2020/0334485 A1     Oct. 22, 2020

Related U.S. Application Data

(63) Continuation-in-part of application No. 16/448,753, filed on Jun. 21, 2019, now Pat. No. 10,762,681.

(30) Foreign Application Priority Data

Jun. 26, 2018   (IN) .............................. 201811023775

(51) Int. Cl.
*G06K 9/46*      (2006.01)
*G06T 3/20*      (2006.01)
(Continued)

(52) U.S. Cl.
CPC .......... *G06K 9/46* (2013.01); *G01C 21/3453* (2013.01); *G06K 9/0063* (2013.01); *G06K 9/54* (2013.01);
(Continued)

(58) Field of Classification Search
CPC .......... G06K 9/46; G06K 9/0063; G06K 9/54; G06K 2209/23; G06K 9/00785;
(Continued)

(56) References Cited

U.S. PATENT DOCUMENTS 7,889,913 B2   2/2011   Wells
8,643,678 B1   2/2014   Jacobs et al.
(Continued)

FOREIGN PATENT DOCUMENTS

CN      101894382 A     11/2010
DE   102018203242 A1     9/2019
(Continued)

OTHER PUBLICATIONS

U.S. Appl. No. 16/448,753, filed Jun. 21, 2019, 2020/0035004 A1, Allowed.
(Continued)

*Primary Examiner* — Maurice L. McDowell, Jr.
(74) *Attorney, Agent, or Firm* — Alston & Bird LLP

(57) ABSTRACT

A method, system and computer program product are configured to analyze an image of a vehicle to determine a characteristic of the vehicle, such as may be represented by or otherwise at least partially defined by the shadow cast by the vehicle. In the context of a method, information is received identifying a vehicle from a raster image and the pixel values of the raster image are evaluated to identify pixels having pixel values representative of a shadow associated with the vehicle. The method also modifies a representation of the shadow by modifying the pixel values of the pixels based upon a shape of the vehicle such that the representation of the shadow, as modified, has a shape corresponding to the shape of the vehicle. The method (Continued)

additionally determines a characteristic of the vehicle based upon the representation of the shadow, as modified, that is associated with the vehicle.

20 Claims, 7 Drawing Sheets

(51) Int. Cl.
*G06T 3/00* (2006.01)
*G06T 7/62* (2017.01)
*G06K 9/00* (2006.01)
*G01C 21/34* (2006.01)
*G06K 9/54* (2006.01)

(52) U.S. Cl.
CPC .............. *G06T 3/0068* (2013.01); *G06T 3/20* (2013.01); *G06T 7/62* (2017.01); *G06K 2209/23* (2013.01); *G06T 2207/10032* (2013.01); *G06T 2207/30252* (2013.01)

(58) Field of Classification Search
CPC ........... G06T 3/20; G06T 3/0068; G06T 7/62; G06T 2207/10032; G06T 2207/30252; G06T 5/008; G01C 21/3453; G01C 21/3461
See application file for complete search history.

(56) References Cited

U.S. PATENT DOCUMENTS

| | | | |
|---|---|---|---|
| 10,762,681 B2* | 9/2020 | Sameer | G06T 11/60 |
| 2002/0123841 A1 | 9/2002 | Satoh et al. | |
| 2004/0263514 A1 | 12/2004 | Jin et al. | |
| 2007/0115284 A1 | 5/2007 | Kim et al. | |
| 2008/0118149 A1* | 5/2008 | Fu | G06K 9/00805 |
| | | | 382/174 |
| 2009/0094557 A1 | 4/2009 | Howard | |
| 2010/0177095 A1 | 7/2010 | Watkins et al. | |
| 2011/0216962 A1* | 9/2011 | Kim | G06T 7/507 |
| | | | 382/154 |
| 2013/0222432 A1 | 8/2013 | Arrasvuori et al. | |
| 2014/0204205 A1* | 7/2014 | Kotz | G06T 7/20 |
| | | | 348/142 |
| 2014/0376769 A1* | 12/2014 | Bulan | G06K 9/00771 |
| | | | 382/103 |
| 2015/0003741 A1 | 1/2015 | Zhang et al. | |
| 2015/0187128 A1 | 7/2015 | Jones et al. | |
| 2015/0317536 A1* | 11/2015 | Kuehnle | G06T 7/73 |
| | | | 382/104 |
| 2016/0314357 A1 | 10/2016 | Fey et al. | |
| 2019/0282097 A1* | 9/2019 | Novotny | G16H 30/40 |
| 2019/0339706 A1* | 11/2019 | Batur | G06T 7/20 |
| 2020/0151912 A1* | 5/2020 | Torikura | G06K 9/4652 |

FOREIGN PATENT DOCUMENTS

| | | |
|---|---|---|
| JP | 2007129277 A | 5/2007 |
| JP | 2009 070097 A | 4/2009 |
| KR | 20000050372 A | 8/2000 |

OTHER PUBLICATIONS

Irvin, R. B. et al., Methods for Exploiting the Relationship Between Buildings and Their Shadows in Aerial Imagery, Carnegie Mellon University (Dec. 25, 1988) 19 pages.

Song, H. et al., Shadow Detection and Reconstruction in High-Resolution Satellite Images via Morphological Filtering and Example-Based Learning, IEEE Transactions on Geoscience and remote sensing (2013) 10 pages.

Wang, Q. et al., An Automatic Shadow Detection Method for VHR Remote sensing Orthoimagery, Remote Sens. 9 (2017) 25 pages.

Zhang, X. et al., Image-Based Building Shadow Generation by Shape From Shadow Silhouette Technique, Paper, Special Edition, Video Information Retrieval and Editing, vol. 55, No. 3 (2001) 405-411.

Notice of Allowance for U.S. Appl. No. 16/448,753 dated Apr. 30, 2020.

Proceedings: Image Understanding Workshop (Apr. 1979), 184 pages.

Zhao, T. et al., *Car Detection in Low Resolution Aerial Image*, IEEE (2001) 8 pages.

Ibarra-Arenado, M. et al., *Shadow-based Vehicle Detection in Urban Traffic*, Sensors 17, 975 (2017) 1-19.

Non-Final Office Action for U.S. Appl. No. 16/942,243 dated Jun. 23, 2021.

Notice of Allowance for U.S. Appl. No. 16/942,243 dated Jul. 23, 2021.

* cited by examiner

SYSTEM AND METHOD FOR ANALYZING AN IMAGE OF A VEHICLE

CROSS-REFERENCE TO RELATED APPLICATIONS

This application is a continuation-in-part of U.S. patent application Ser. No. 16/448,753, filed Jun. 21, 2019, which claims priority to Indian Application No. 201811023775, filed Jun. 26, 2018, the entire contents of both of which are incorporated herein by reference.

TECHNOLOGICAL FIELD

An example embodiment relates generally to a method, system and computer program product for analyzing an image of a vehicle and, more particularly, to a method, system and computer program product for determining a characteristic of a vehicle based upon the analysis of an image of the vehicle including a shadow cast by the vehicle.

BACKGROUND

Traffic and fleet management, hereinafter referenced, both collectively and individually, as traffic management, are performed for a variety of purposes. For individual vehicles, traffic management can serve many purposes including the routing and navigation of a vehicle in an effort to provide for reliable and efficient travel from an origin to a destination. Traffic management can also be performed more generally for a road network or a portion of a road network. For example, the information gathered analyzed regarding traffic volume and the type of traffic carried by the road network can serve to inform the maintenance and design of the road network.

The data regarding vehicular travel over a road network upon which traffic management is premised can be gathered in various manners. Most commonly, probe data points can be collected from vehicles, such as from in-vehicle navigation systems or from mobile devices, such as mobile telephones, carried by individuals onboard a vehicle. The probe data provides information regarding the location of a vehicle at a particular point in time, which can facilitate the provision of navigation and mapping services for the vehicle. By aggregating the probe data points, information regarding traffic on the various road segments can be collected and then utilized for various other traffic management purposes.

Although probe data is commonly utilized for traffic management purposes, traffic management typically does not rely solely on probe data as there may be gaps in the coverage provided by the probe data, at least during certain periods of time or for certain road segments, and there may sometimes be an insufficient quantity of probe data for one or more road segments, such as in conjunction with lightly traveled road segments. Additionally, while probe data is useful to determine the location of vehicle at a particular point in time, probe data does not generally allow for the identification of other physical characteristics of the vehicle that may be useful for some aspects of traffic management.

As such, traffic management may also rely upon aerial or satellite imagery of at least a portion of the road network from which vehicles are identified and utilized for traffic management purposes. In order to reliably identify objects as vehicles, relatively high resolution imagery, such as imagery obtained by Light Detection and Ranging (LIDAR) techniques, may be utilized. While high resolution imagery provides data from which vehicles can generally be identified, the capture of the high resolution imagery requires relatively sophisticated equipment and the processing of the high resolution imagery to extract data representative of the vehicles may be computationally intensive, thereby consuming substantial processing resources.

Lower resolution imagery, such as raster imagery, is available and data representative of vehicles may be extracted from the raster imagery in a less computationally intensive manner. However, the data representative of the vehicles and, in particular, the data representative of the shadows cast by the vehicles that is obtained from the raster imagery includes a substantial amount of noise and speckle. The noise and speckle results in a generation of an image of the vehicles and of the shadows cast by the vehicles that is inaccurate or other distorted. Even after additional processing of the data, such as by utilizing a Convolutional Neural Network (CNN), deep learning techniques and/or artificial intelligence techniques, the resulting image including the shadows cast by the vehicles within the image remains noisy and speckled and is generally of lower quality then is desired. As such, characteristics of the vehicles may be difficult to determine, at least in a reliable manner, based upon the resulting images.

BRIEF SUMMARY

A method, system and computer program product are provided in accordance with an example embodiment in order to analyze an image of a vehicle to determine a characteristic of the vehicle, such as may be represented by or otherwise at least partially defined by the shadow cast by the vehicle, in a manner that is accurate and efficient. In this regard, the method, system and computer program product of an example embodiment may rely upon raster imagery so as to conserve processing resources and be more computational efficient than in an instance in which high resolution imagery is utilized. However, the method, system and computer program product of an example embodiment process the raster imagery, such as by refining the shadow cast by a vehicle present in the raster imagery, in a manner that improves the accuracy of the resulting shadow, such that characteristics of the vehicle that are dependent upon the shadow cast by the vehicle can be determined with more accuracy and reliability.

In an example embodiment, a vehicle analysis system is provided that includes processing circuitry and at least one memory including computer program code with the at least one memory and computer program code configured to, with the processing circuitry, cause the vehicle analysis system to at least receive information identifying a vehicle from a raster image and to evaluate pixel values of the raster image to identify pixels having pixel values representative of a shadow associated with the vehicle. The at least one memory and computer program code are also configured to, with the processing circuitry, cause the vehicle analysis system to modify a representation of the shadow by modifying the pixel values of the pixels based upon a shape of the vehicle such that the representation of the shadow, as modified, has a shape corresponding to the shape of the vehicle. The at least one memory and computer program code are further configured to, with the processing circuitry, cause the vehicle analysis system to determine a characteristic of the vehicle based upon the representation of the shadow, as modified, that is associated with the vehicle.

The at least one memory and the computer program code are configured to, with the processing circuitry, cause the vehicle analysis system of an example embodiment to modify the representation of the shadow by translating a representation of the vehicle toward an edge of the representation of the shadow and modifying the pixel values of respective pixels of the shadow to more closely align the edge of the representation of the shadow with the translated representation of the vehicle. In an example embodiment, the at least one memory and the computer program code are configured to, with the processing circuitry, cause the vehicle analysis system to modify the representation of the shadow by modifying the pixel values of respective pixels based upon a shape of the vehicle such that the representation of the shadow, as modified, has an identical shape to the shape of the vehicle. The at least one memory and the computer program code are further configured to, with the processing circuitry, cause the vehicle analysis system of an example embodiment to determine a navigational route for the vehicle based at least in part upon the characteristic of the vehicle.

The at least one memory and the computer program code are configured to, with the processing circuitry, cause the vehicle analysis system of an example embodiment to determine the characteristic of the vehicle by determining a height of the vehicle based upon the representation of the shadow, as modified, that is associated with the vehicle in relation to a shadow associated with a reference vehicle of a known height. In this example embodiment, the at least one memory and the computer program code may be further configured to, with the processing circuitry, cause the vehicle analysis system to determine the characteristic of the vehicle by determining a width and a length of the vehicle based upon an image of the vehicle and determining a volume of the vehicle based upon a product of the height, width and length of the vehicle. The at least one memory and the computer program code may be further configured to, with the processing circuitry, cause the vehicle analysis system if this example embodiment to determine the characteristic of the vehicle by determining a type of vehicle based upon one or more of the height, width, length or volume of the vehicle. In this example embodiment, the at least one memory and the computer program code may be further configured to, with the processing circuitry, cause the vehicle analysis system to determine the characteristic of the vehicle by determining a weight of the vehicle based upon the type of vehicle.

In another example embodiment, a method is provided for analyzing an image of a vehicle. The method includes receiving information identifying a vehicle from a raster image and evaluating pixel values of the raster image to identify pixels having pixel values representative of a shadow associated with the vehicle. The method also includes modifying a representation of the shadow by modifying the pixel values of the pixels based upon a shape of the vehicle such that the representation of the shadow, as modified, has a shape corresponding to the shape of the vehicle. The method further includes determining a characteristic of the vehicle based upon the representation of the shadow, as modified, that is associated with the vehicle.

The method of an example embodiment modifies the representation of the shadow by translating a representation of the vehicle toward an edge of the representation of the shadow and modifying the pixel values of respective pixels of the shadow to more closely align the edge of the representation of the shadow with the translated representation of the vehicle. In an example embodiment, the method modifies the representation of the shadow by modifying the pixel values of respective pixels based upon a shape of the vehicle such that the representation of the shadow, as modified, has an identical shape to the shape of the vehicle. The method of an example embodiment may also include determining a navigational route for the vehicle based at least in part upon the characteristic of the vehicle.

The method of an example embodiment determines the characteristic of the vehicle by determining a height of the vehicle based upon the representation of the shadow, as modified, that is associated with the vehicle in relation to a shadow associated with a reference vehicle of a known height. In an example embodiment, the method may also determine the characteristic of the vehicle by determining a width and a length of the vehicle based upon an image of the vehicle and determining a volume of the vehicle based upon a product of the height, width and length of the vehicle. The method of an example embodiment may additionally determine the characteristic of the vehicle by determining a type of vehicle based upon one or more of the height, width, length or volume of the vehicle. In this example embodiment, the method may also determine the characteristic of the vehicle by determining a weight of the vehicle based upon the type of vehicle.

In a further example embodiment, a computer program product is configured to analyze an image of a vehicle. The computer program product includes at least one non-transitory computer-readable storage medium having computer-executable program code portions stored therein with the computer-executable program code portions including program code instructions configured to receive information identifying a vehicle from a raster image and program code instructions configured to evaluate pixel values of the raster image to identify pixels having pixel values representative of a shadow associated with the vehicle. The computer-executable program code portions also include program code instructions configured to modify a representation of the shadow by modifying the pixel values of the pixels based upon a shape of the vehicle such that the representation of the shadow, as modified, has a shape corresponding to the shape of the vehicle. The computer-executable program code portions further include program code instructions configured to determine a characteristic of the vehicle based upon the representation of the shadow, as modified, that is associated with the vehicle.

The program code instructions configured to modify the representation of the shadow in accordance with an example embodiment include program code instructions configured to translate a representation of the vehicle toward an edge of the representation of the shadow and program code instructions configured to modify the pixel values of respective pixels of the shadow to more closely align the edge of the representation of the shadow with the translated representation of the vehicle. In an example embodiment, the program code instructions configured to modify the representation of the shadow include program code instructions configured to modify the pixel values of respective pixels based upon a shape of the vehicle such that the representation of the shadow, as modified, has an identical shape to the shape of the vehicle. The computer-executable program code portions of an example embodiment may also include program code instructions configured to determine a navigational route for the vehicle based at least in part upon the characteristic of the vehicle.

The program code instructions configured to determine the characteristic of the vehicle in accordance with an example embodiment include program code instructions configured to determine a height of the vehicle based upon the representation of the shadow, as modified, that is associated with the vehicle in relation to a shadow associated with a reference vehicle of a known height. In an example embodiment, the program code instructions configured to determine the characteristic of the vehicle may also include program code instructions configured to determine a width and a length of the vehicle based upon an image of the vehicle and program code instructions configured to determine a volume of the vehicle based upon a product of the height, width and length of the vehicle. The program code instructions configured in accordance with an example embodiment to determine the characteristic of the vehicle may also include program code instructions configured to determine a type of vehicle based upon one or more of the height, width, length or volume of the vehicle. In this example embodiment, the program code instructions configured to determine the characteristic of the vehicle may also include program code instructions configured to determine a weight of the vehicle based upon the type of vehicle.

In yet another example embodiment, an apparatus is provided that is configured to analyze an image of a vehicle. The apparatus includes means for receiving information identifying a vehicle from a raster image and means for evaluating pixel values of the raster image to identify pixels having pixel values representative of a shadow associated with the vehicle. The apparatus also includes means for modifying a representation of the shadow by modifying the pixel values of the pixels based upon a shape of the vehicle such that the representation of the shadow, as modified, has a shape corresponding to the shape of the vehicle. The apparatus further includes means for determining a characteristic of the vehicle based upon the representation of the shadow, as modified, that is associated with the vehicle.

The means for modifying the representation of the shadow in accordance with an example embodiment includes means for translating a representation of the vehicle toward an edge of the representation of the shadow and means for modifying the pixel values of respective pixels of the shadow to more closely align the edge of the representation of the shadow with the translated representation of the vehicle. In an example embodiment, the means for modifying the representation of the shadow includes means for modifying the pixel values of respective pixels based upon a shape of the vehicle such that the representation of the shadow, as modified, has an identical shape to the shape of the vehicle. The apparatus of an example embodiment may also include means for determining a navigational route for the vehicle based at least in part upon the characteristic of the vehicle.

The means for determining the characteristic of the vehicle in accordance with an example embodiment includes means for determining a height of the vehicle based upon the representation of the shadow, as modified, that is associated with the vehicle in relation to a shadow associated with a reference vehicle of a known height. In an example embodiment, the means for determining the characteristic of the vehicle also includes means for determining a width and a length of the vehicle based upon an image of the vehicle and means for determining a volume of the vehicle based upon a product of the height, width and length of the vehicle. The means for determining the characteristic of the vehicle in accordance with an example embodiment may include means for determining a type of vehicle based upon one or more of the height, width, length or volume of the vehicle. In this example embodiment, the means for determining the characteristic of the vehicle may include means for determining a weight of the vehicle based upon the type of vehicle.

In an example embodiment, a system is provided that is configured to determine a height of a vehicle based upon a shadow cast by the vehicle. The system includes processing circuitry and at least one memory including computer program code with the at least one memory and computer program code configured to, with the processing circuitry, cause the system to receive information identifying the vehicle from a raster image. The at least one memory and computer program code are also configured to, with the processing circuitry, cause the system to evaluate pixel values of the raster image to identify pixels having pixel values representative of the shadow associated with the vehicle. The at least one memory and computer program code are further configured to, with the processing circuitry, cause the system to determine a height of the vehicle based upon the shadow associated with the vehicle in relation to a correlation between a shadow associated with a reference vehicle and a height of the reference vehicle.

The at least one memory and computer program code are further configured to, with the processing circuitry, cause the system of an example embodiment to identify the shadow associated with the reference vehicle from an aerial image of the reference vehicle, identify the height of the reference vehicle from a street level image of the reference vehicle and determine the correlation between the shadow associated with the reference vehicle and the height of the reference vehicle. In an example embodiment, the raster image of the vehicle is captured while the vehicle is within a geographical region, and the aerial image of the reference vehicle is captured while the reference vehicle is within the same geographical region. The at least one memory and computer program code are configured to, with the processing circuitry, cause the system of an example embodiment to identify the shadow associated with the reference vehicle by determining a width of the shadow associated with the reference vehicle. In this example embodiment, the at least one memory and computer program code are configured to, with the processing circuitry, cause the system to determine the height of the vehicle by determining the height of the vehicle based upon a width of the shadow associated with the vehicle in relation to the correlation between the width of the shadow associated with the reference vehicle and the height of the reference vehicle.

In another example embodiment, a method is provided for determining a height of a vehicle based upon a shadow cast by the vehicle. The method includes receiving information identifying the vehicle from a raster image. The method also includes evaluate pixel values of the raster image to identify pixels having pixel values representative of the shadow associated with the vehicle. The method further includes determining a height of the vehicle based upon the shadow associated with the vehicle in relation to a correlation between a shadow associated with a reference vehicle and a height of the reference vehicle.

The method of an example embodiment also includes identifying the shadow associated with the reference vehicle from an aerial image of the reference vehicle, identifying the height of the reference vehicle from a street level image of the reference vehicle and determining the correlation between the shadow associated with the reference vehicle and the height of the reference vehicle. In an example embodiment, the raster image of the vehicle is captured while the vehicle is within a geographical region, and the aerial image of the reference vehicle is captured while the reference vehicle is within the same geographical region. The method of an example embodiment identifies the shadow associated with the reference vehicle by determining a width of the shadow associated with the reference vehicle. In this example embodiment, the method may determine the height of the vehicle by determining the height of the vehicle based upon a width of the shadow associated with the vehicle in relation to the correlation between the width of the shadow associated with the reference vehicle and the height of the reference vehicle.

In a further example embodiment, a computer program product is provided that is configured to determine a height of a vehicle based upon a shadow cast by the vehicle. The computer program product includes at least one non-transitory computer-readable storage medium having computer-executable program code portions stored therein with the computer-executable program code portions including program code instructions configured to receive information identifying the vehicle from a raster image. The computer-executable program code portions also include program code instructions configured to evaluate pixel values of the raster image to identify pixels having pixel values representative of the shadow associated with the vehicle. The computer-executable program code portions further include program code instructions configured to determine a height of the vehicle based upon the shadow associated with the vehicle in relation to a correlation between a shadow associated with a reference vehicle and a height of the reference vehicle.

The computer-executable program code portions of an example embodiment also include program code instructions configured to identify the shadow associated with the reference vehicle from an aerial image of the reference vehicle, program code instructions configured to identify the height of the reference vehicle from a street level image of the reference vehicle and program code instructions configured to determine the correlation between the shadow associated with the reference vehicle and the height of the reference vehicle. In an example embodiment, the raster image of the vehicle is captured while the vehicle is within a geographical region, and the aerial image of the reference vehicle is captured while the reference vehicle is within the same geographical region. The program code instructions configured to identify the shadow associated with the reference vehicle in accordance with an example embodiment include program code instructions configured to determine a width of the shadow associated with the reference vehicle. In this example embodiment, the program code instructions configured to determine the height of the vehicle may include program code instructions configured to determine the height of the vehicle based upon a width of the shadow associated with the vehicle in relation to the correlation between the width of the shadow associated with the reference vehicle and the height of the reference vehicle.

In yet another example embodiment, an apparatus is provided that is configured to determine a height of a vehicle based upon a shadow cast by the vehicle. The apparatus includes means for receiving information identifying the vehicle from a raster image. The apparatus also includes means for evaluating pixel values of the raster image to identify pixels having pixel values representative of the shadow associated with the vehicle. The apparatus further includes means for determining a height of the vehicle based upon the shadow associated with the vehicle in relation to a correlation between a shadow associated with a reference vehicle and a height of the reference vehicle.

The apparatus of an example embodiment also includes means for identifying the shadow associated with the reference vehicle from an aerial image of the reference vehicle, means for identifying the height of the reference vehicle from a street level image of the reference vehicle and means for determining the correlation between the shadow associated with the reference vehicle and the height of the reference vehicle. In an example embodiment, the raster image of the vehicle is captured while the vehicle is within a geographical region, and the aerial image of the reference vehicle is captured while the reference vehicle is within the same geographical region. The means for identifying the shadow associated with the reference vehicle may include means for determining a width of the shadow associated with the reference vehicle. In this example embodiment, the means for determining the height of the vehicle may include means for determining the height of the vehicle based upon a width of the shadow associated with the vehicle in relation to the correlation between the width of the shadow associated with the reference vehicle and the height of the reference vehicle.

BRIEF DESCRIPTION OF THE DRAWINGS

Figure 1:
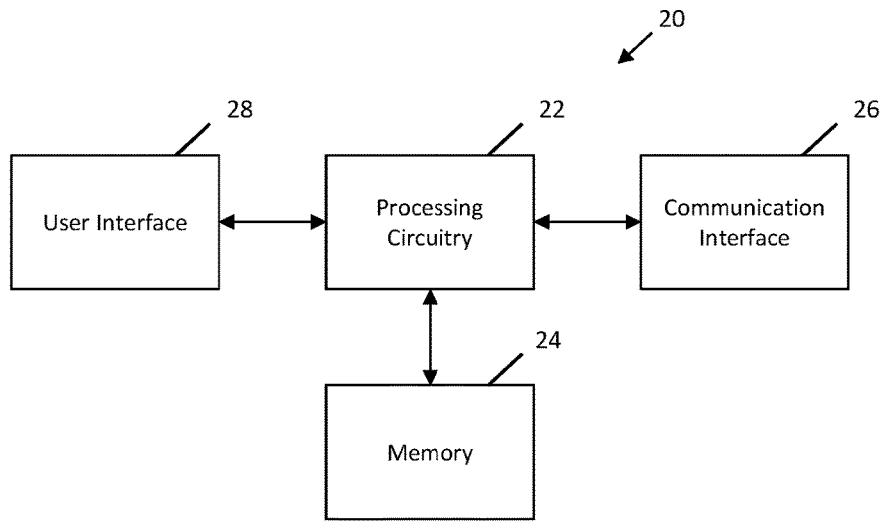
Figure 2:
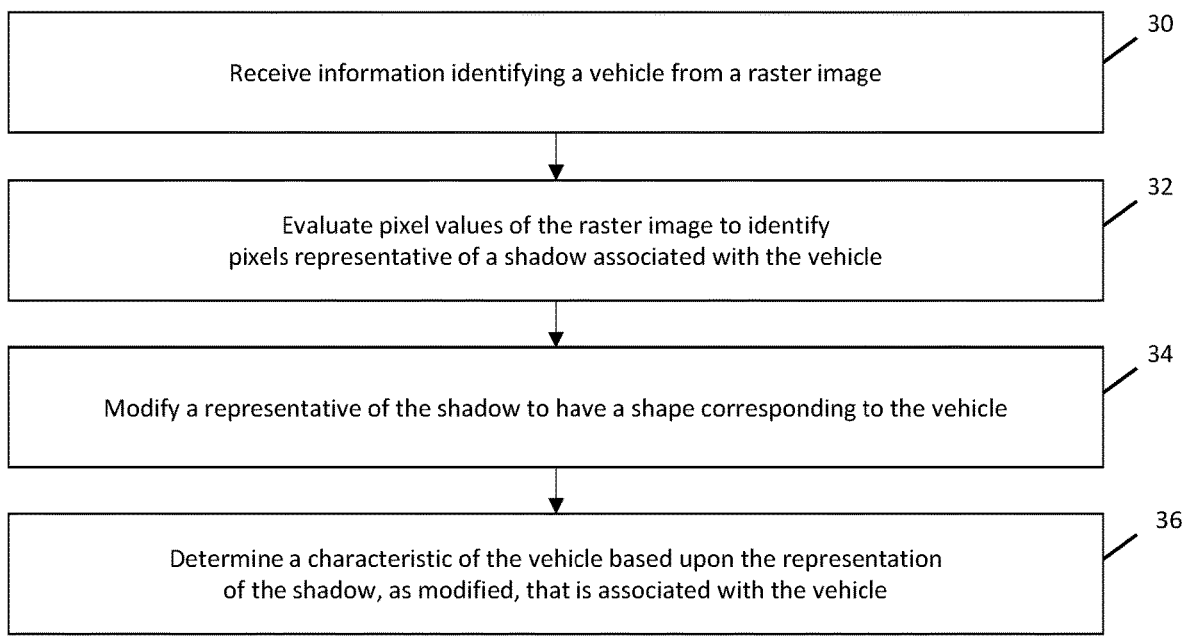
Figure 3:
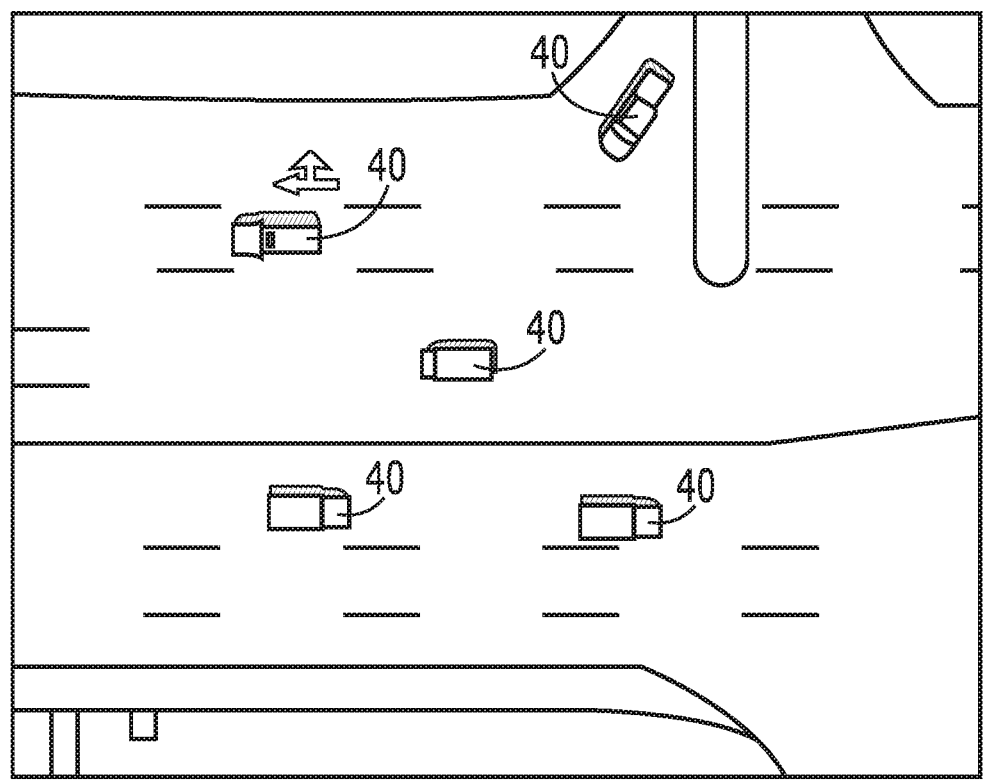
Figure 4:
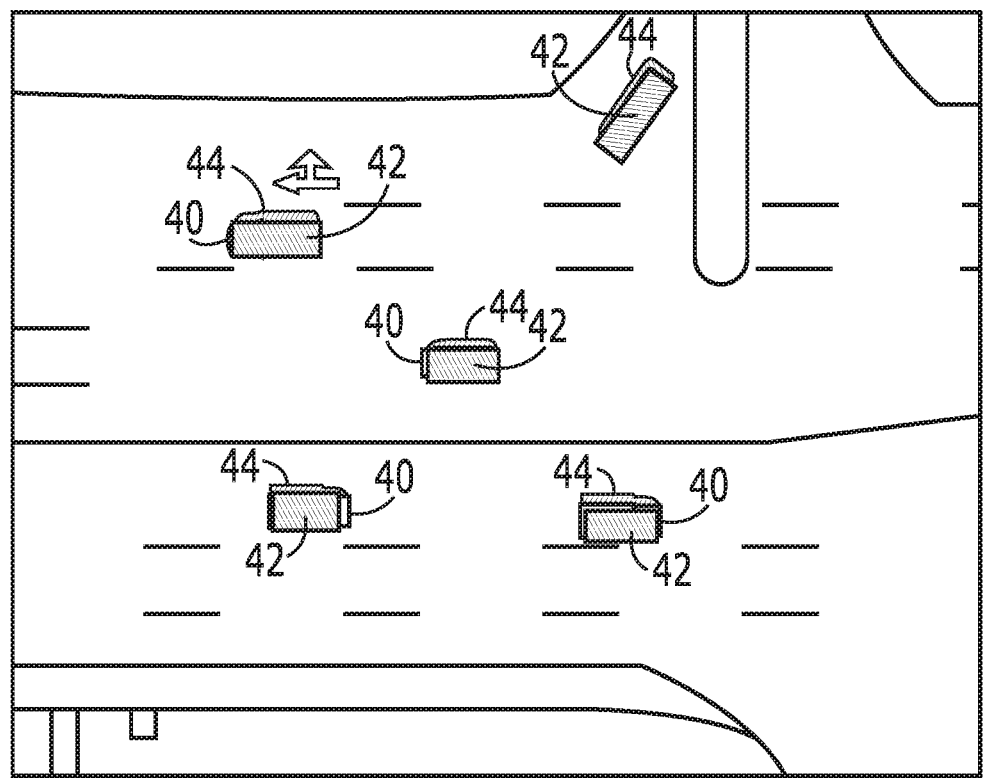
Figure 5:
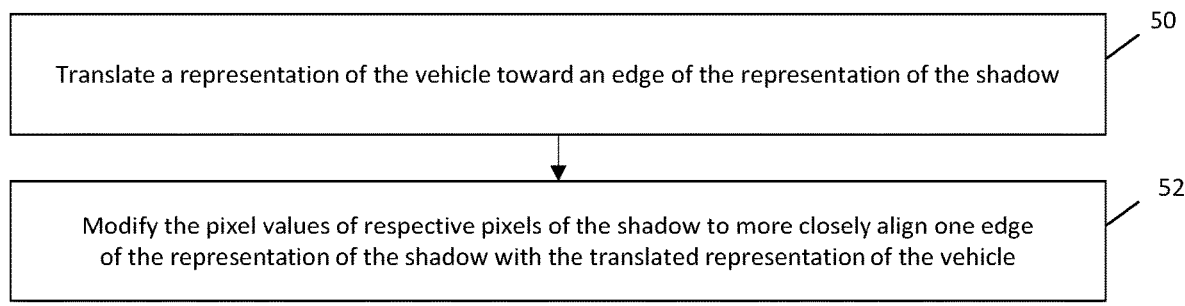
Figure 6:
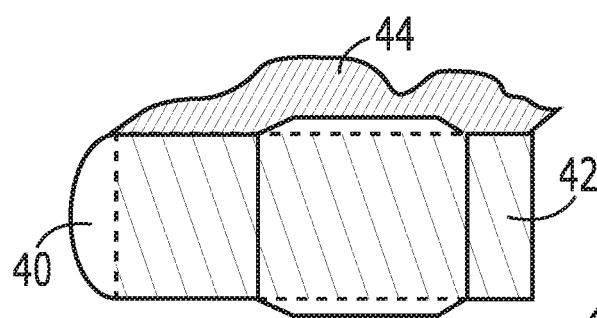
Figure 7:
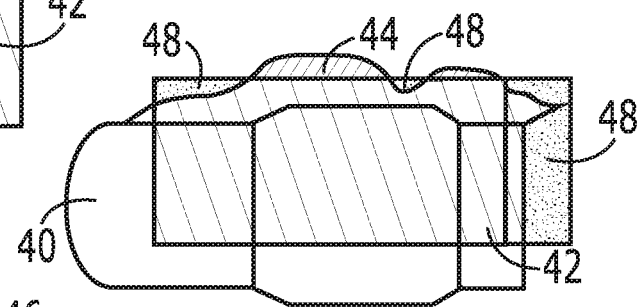
Figure 8:
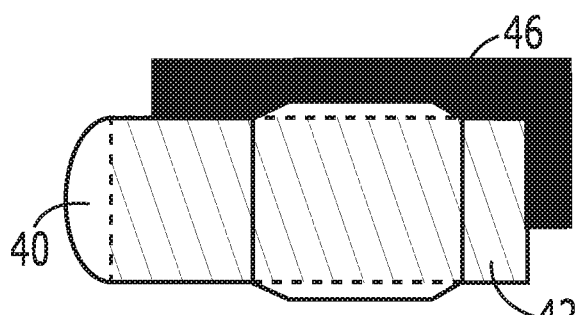
Figure 9:
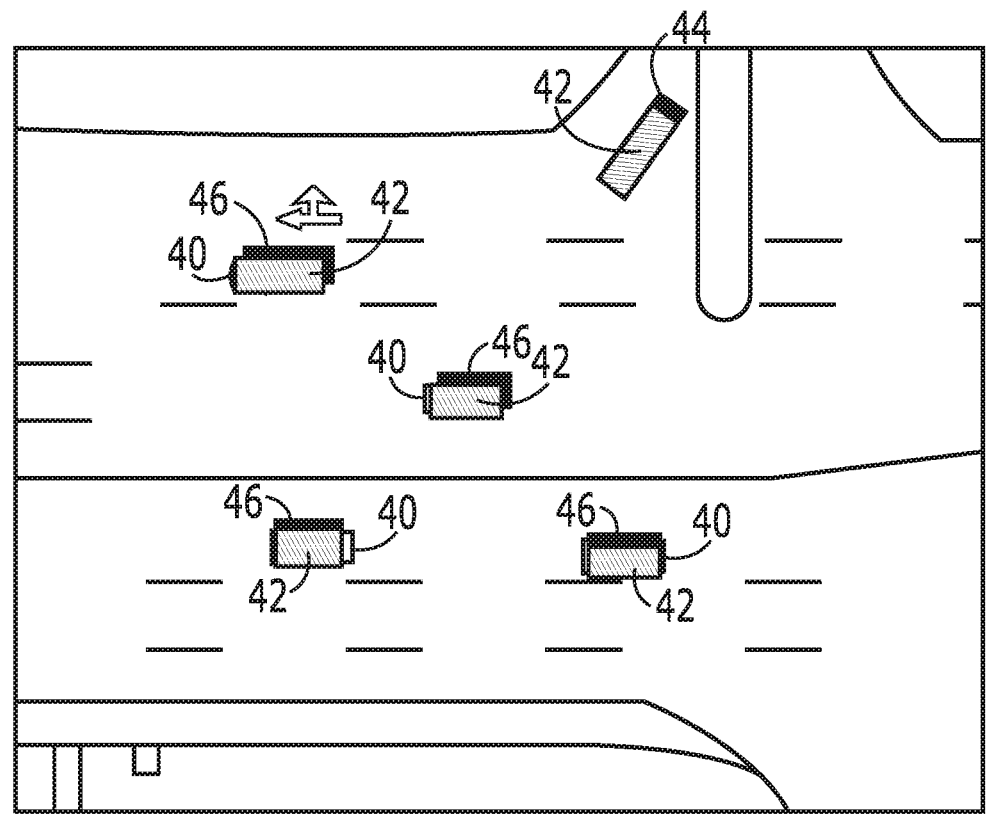
Figure 10:
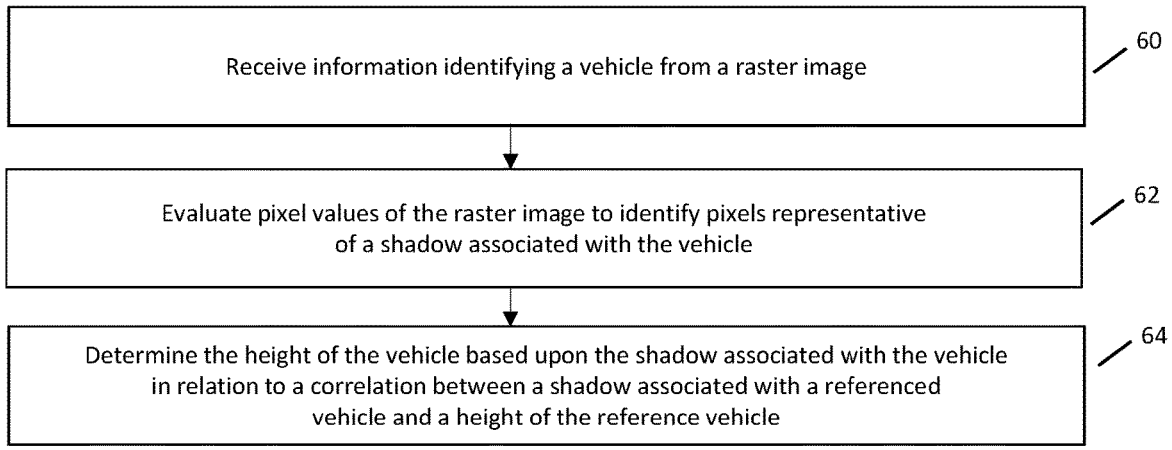
Figure 11:
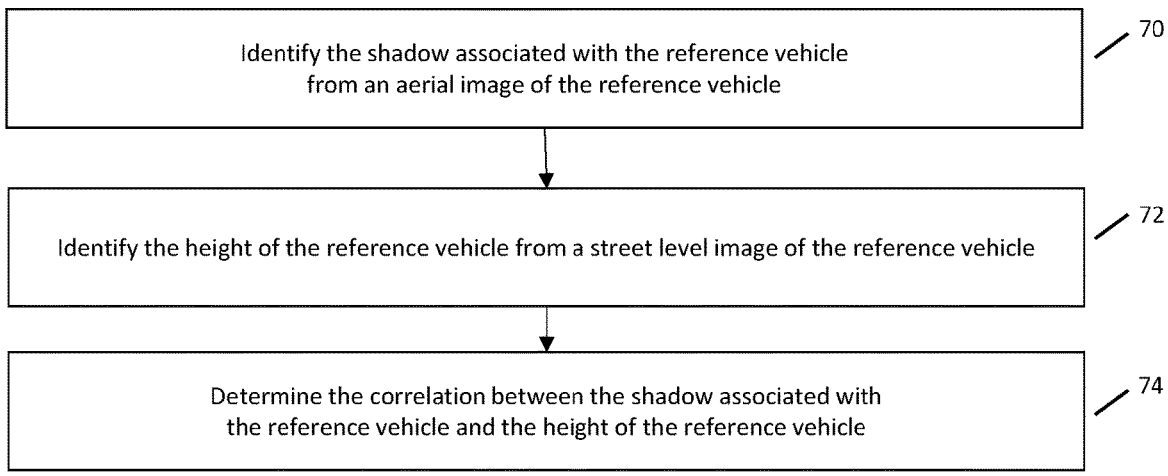
Figure 12A:
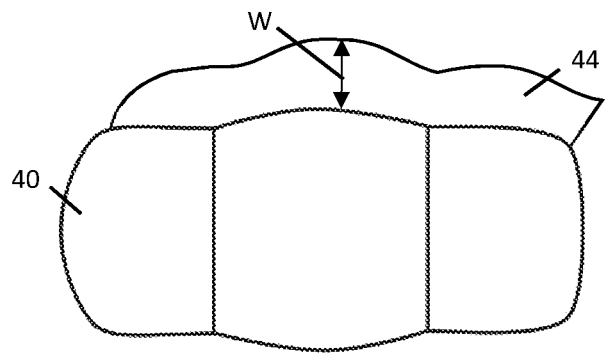
Figure 12B:
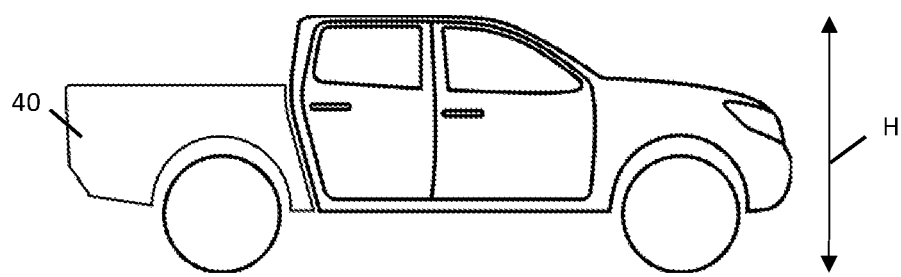
Figure 13:
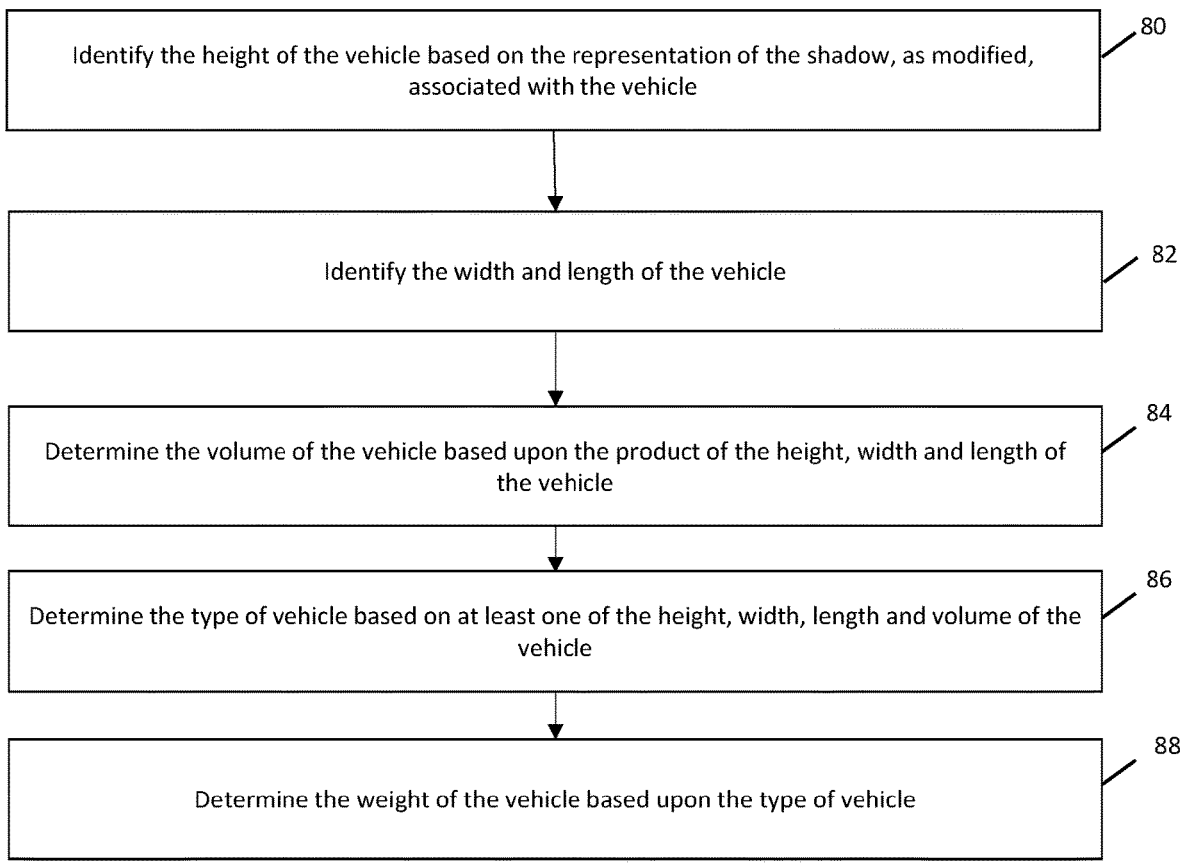

Having thus described certain example embodiments of the present disclosure in general terms, reference will now be made to the accompanying drawings, which are not necessarily drawn to scale, and wherein:

FIG. 1 is a block diagram of system that may be specifically configured in accordance with an example embodiment of the present disclosure;

FIG. 2 is a flowchart illustrating the operations performed, such as by the system of FIG. 1, in order to analyze an image of a vehicle in accordance with an example embodiment;

FIG. 3 illustrates a portion of a road segment and vehicles traveling along the portion of the road segment as extracted from a raster image;

FIG. 4 depicts the same portion of the road segment and the vehicles traveling therealong as in FIG. 3, but with the vehicles now having been identified as indicated by the rectangular overlays;

FIG. 5 is a flowchart illustrating the operations performed, such as by the system of FIG. 1, in order to modify the representation of a shadow in the image in accordance with an example embodiment of the present disclosure;

FIG. 6 depicts an image of a vehicle and the shadow cast by the vehicle with the vehicle having been identified;

FIG. 7 is an image of the vehicle of FIG. 6 in which a representation of the vehicle has been translated relative to the shadow in order to refine the shape of the shadow in accordance with an example embodiment of the present disclosure;

FIG. 8 is an image of the vehicle identified in FIG. 6 in which the shadow cast by the vehicle has now been refined in accordance with an example embodiment to the present disclosure;

FIG. 9 illustrates the same portion of road network and the vehicles traveling therealong as in FIGS. 3 and 4, but with the shadows cast by the vehicles now having been refined in accordance with an example embodiment of the present disclosure;

FIG. 10 is a flowchart illustrating the operations performed, such as by the system of FIG. 1, in order to determine the height of a vehicle based upon a shadow cast by the vehicle in accordance with another example embodiment of the present disclosure;

FIG. 11 is a flowchart illustrating the operations performed, such as by the system of FIG. 1, in order to determine a correlation between the shadow associated with a reference vehicle and the height of the reference vehicle in accordance with an example embodiment of the present disclosure;

FIGS. 12a and 12b are a street level image and an aerial image, respectively, of a reference vehicle that are utilized in order to determine the correlation between the shadow associated with the reference vehicle and the height of the reference vehicle as illustrated by FIG. 11; and FIG. 13 is a flowchart illustrating the operations performed, such as by the system of FIG. 1, in order to determine one or more characteristics of the vehicle in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, system and computer program product are provided in accordance with an example embodiment in order to analyze the image of a vehicle including the shadow of the vehicle and to determine a characteristic of the vehicle based upon the shadow. Although various characteristics may be determined, the vehicle analysis system and method of an example embodiment are configured to determine the height, volume, weight and/or type of vehicle based at least in part upon the shadow cast by the vehicle. Based upon the characteristic of the vehicle that is determined from the an analysis of the shadow cast by the vehicle, information that is useful for traffic management is obtained. For example, the information may inform federal, state, regional, municipal or other authorities responsible for the design, construction and maintenance of a road network as to the load imposed upon various road segments by the vehicular traffic. Further, the height, weight and/or type of a vehicle may be utilized in conjunction with navigation and route planning for the vehicle to ensure that the route to be taken by the vehicle supports a vehicle of the determined height, weight and/or type. These examples of traffic management that are at least partially based on the characteristic of a vehicle that is determined in accordance with an example embodiment based upon the shadow cast by the vehicle are provided by way of illustration and are not intended to be limiting as other traffic management and/or additional applications may also utilize the characteristic of the vehicle that is determined based at least in part upon the shadow cast by the vehicle.

A system of an example embodiment may be embodied by any of a variety of computing devices including, for example, by a server, computer workstation, a distributed network of computing devices, a personal computer or the like. In one embodiment, for example, the system is embodied by a navigation system or may otherwise be associated, such as in communication with, a navigation system that is configured to provide to provide navigational features, such as routes, estimated arrival times or the like. Regardless of the type of computing device that embodies the system, the system 20 of one example embodiment is shown in FIG. 1 and includes, is associated with or is otherwise in communication with processing circuitry 22 and a memory device 24 and optionally a communication interface 26 and/or a user interface 28.

In some embodiments of the processing circuitry 22, the processing circuitry may be in communication with the memory device 24 via a bus for passing information among components of the system 20. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the navigation system to carry out various functions in accordance with an example embodiment. For example, the memory device could be configured to buffer input data for processing by the processing circuitry. Additionally or alternatively, the memory device could be configured to store instructions for execution by the processing circuitry.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, the computing device) configured to employ an embodiment by further configuration of the processor by instructions for performing the algorithms and/or operations described herein. The processing circuitry may include, among other things, a clock, an arithmetic logic unit (ALU) and logic gates configured to support operation of the processor.

The system 20 of an example embodiment may also optionally include a communication interface 26, such as in instances in which the system communicates with other devices, such as other computing devices via a network connection. The communication interface may be any means such as a device or circuitry embodied in either hardware or a combination of hardware and software that is configured to receive and/or transmit data from/to other electronic devices in communication therewith. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s).

The system 20 may also optionally include a user interface 28 that may, in turn, be in communication with the processing circuitry 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry may be configured to control one or more functions of one or more user interface elements through computer program instructions (for example, software and/or firmware) stored on a memory accessible to the processing circuitry (for example, memory device 24, and/or the like).

Referring now to FIG. 2, the operations performed, such as by the system 20 of FIG. 1, in order to analyze the image of a vehicle and to determine a characteristic of the vehicle based upon the image and, more particularly, based upon the shadow of the vehicle within the image are illustrated. The analysis of an image of the vehicle is based upon a raster image. The raster image is an aerial image of a portion of a road network and may have been previously captured and stored, such as by the memory device 24 of the system or by a database, cloud storage or other memory device in communication with this system. Alternatively, the system may receive and process the raster imagery in real time or near real time as the raster imagery is captured and provided to the system.

As shown in block 30 of FIG. 2, the system 20 of this example embodiment includes means, such as the processing circuitry 22, the communication interface 26, the user interface 28 or the like, for receiving information identifying a vehicle from a raster image. The vehicle may be identified either manually or in an automated manner. With respect to the manual identification of a vehicle, the raster image may be manually reviewed and input may be provided, such as via the user interface in an instance in which the manual review is performed utilizing the system or via the user interface of another computing system in an instance in which the manual review is supported by another computing system and the information identifying the vehicle is then provided to the system, such as the processing circuitry, via the communication interface. With respect to an automated review, the raster image may be automatically analyzed, such as by the processing circuitry of the system or by another computing system, so as to identify the vehicle therein. In an instance in which another computing device supports the automated identification of vehicle from the raster image, the other computing system may provide the resulting information identifying the vehicle to the system, such as the processing circuitry, via the communication interface.

An example of a raster image of a portion of a road segment over which a plurality of vehicles 40 are traveling is depicted in FIG. 3. Based upon a manual or automated analysis of the raster image of FIG. 3, the vehicles may be identified as depicted in FIG. 4. As shown, a marker 42 is overlaid onto the image of the vehicle representing the identification of the vehicle with the size and shape of the marker generally having the same size and shape, e.g., rectangular, as the vehicle. As such, the information that is received identifying the vehicle from the raster image may identify the location of the vehicle and, in some embodiments, may define the marker, such as the size, shape and orientation of the marker as well as its location within the raster image.

Referring now to block 32 of FIG. 2, the system 20 of an example embodiment also includes means, such as the processing circuitry 22 or the like, for evaluating pixel values of the raster image to identify pixels having pixel values representative of a shadow associated with the vehicle, e.g., cast by the vehicle. In this regard, the apparatus, such as the processing circuitry, may be configured to extract pixel values from the raster image and to then identify the pixels representative of shadows of the vehicles based on the extracted pixel values. In this example embodiment, the apparatus, such as the processing circuitry, is configured to retain pixels having pixel values within a predefined range, while eliminating pixels having other pixel values. The pixels that are retained as a result of having pixel values within the predefined range represent shadows of the vehicles, while those pixels having pixel values that are eliminated represent other features, such as the vehicles, the road segment, the surrounding terrain or other objects. In an example embodiment, pixel values that represent a black color or a color very nearly black are considered to be representative of shadows. Thus, the predefined range of one embodiment includes the pixel values representative of a black color in, in one embodiment, the pixel values representative of a black color and colors that are nearly black. The pixels from a raster image having pixel values representative of a black color or colors that are nearly black are therefore retained as representative of a shadow of a vehicle, while other pixels having pixel values representative of other colors are eliminated, at least for purposes of the creation of an accurate representation of the shadows of a vehicle.

It is noted that some vehicles have a black or very dark color. Even in the instance in which a vehicle is black or has a very dark color, the pixel values of the raster image that are representative of the vehicle have a different pixel value than the pixel values representative of a shadow. Thus, a range of pixel values to be retained in conjunction with the refinement of the representation of the shadows of the vehicles identifies those pixels representative of a shadow without identifying and, instead, eliminating pixels representative of the vehicles including vehicles that are black or very dark in color.

As shown in block 34 of FIG. 2, the system 20 of an example embodiment also includes means, such as the processing circuitry 22 or the like, for modifying the representation of the shadow in order to more accurately represent a shadow cast by the vehicle. In this regard, the system, such as the processing circuitry, is configured to modify the pixel values of respective pixels identified to be representative of the shadow of the vehicle based upon the shape of the vehicle. As modified, the representation of the shadow will have a shape corresponding to the shape of the vehicle, such as more closely corresponding to the shape of the vehicle than those pixels initially identified to be representative of the shadow of the vehicle. In an example embodiment, the representation of the shadow, as modified, has a shape that is identical to the shape of the vehicle.

The representation of a shadow may be modified by modifying the pixel values of respective pixels based upon the shape of the vehicle in various manners. In an example embodiment depicted in FIG. 5, however, the system 20 includes means, such as the processing circuitry 22 or the like, for modifying the representation of the shadow by translating a representation of the vehicle toward an edge of the representation of the shadow. By way of example and as shown in FIG. 6, the outline of the vehicle 40 is depicted in two dimensions and the marker 42 created upon the identification of the vehicle from the raster image is overlaid thereupon. The representation of the shadow 44 of FIG. 6 has been derived from a raster image by processing the pixel values so as to retain pixels having pixel values within a predefined range while eliminating pixels having other values. The location of the vehicle and the location of the representation of the shadow cast by the vehicle may be similarly defined by the relative locations of the pixels of the raster image such that the representation of the shadows is located proximate, but offset from the representation of the corresponding vehicle.

While the shadow 44 provides a general approximation of the shape of the vehicle 40, the shadow may have a shape or outline that varies significantly from the corresponding shape or outline of the vehicle. These variations may be due to a variety of factors, such as noise present in the capture of the raster imagery since the raster imagery is of lower resolution than LIDAR or other types of high-resolution imagery. Additionally, the representation of a shadow may deviate from the representation of the corresponding vehicle due to objects proximate the vehicles, such as light poles, traffic lights, bridges, walkways, other vehicles or the like. Further, the representation of the shadow may include speckle that further diminishes the quality of the image.

As indicated above with respect to block 50 of FIG. 5 and for which an example is depicted in FIG. 7, a representation of the vehicle, such as a two-dimensional representation of the vehicle and, more particularly, the marker 42 created upon the identification of the vehicle from the raster image and overlaid upon the image of the vehicle, is translated towards an edge of the representation of the shadow associated with the vehicle. The representation of the vehicle, e.g., the marker, is translated from an original position as shown in a dashed outline in FIG. 6 to a translated position as shown in solid lines in FIG. 7. In this example embodiment, the representation of the vehicle is translated in two dimensions such as the x and y directions, such that the translated representation of the vehicle, e.g., the translated marker, is located proximate the edge of the representation of the shadow corresponding to the vehicle. Alternatively, the representation of the vehicle, e.g., the marker, may be translated in only a single direction.

The direction in which the representation of the vehicle 40, e.g., the marker 42, is translated may be defined in various manners. For example, the direction in which the representation of the vehicle is translated may be predefined, such as based upon the position and angle of the sun relative to the vehicle at the time at which the raster image was captured with the resulting direction in which the representation of the vehicle is translated being representative of the direction in which shadows 44 were cast by the vehicles at the time at which the raster image was captured. Alternatively, the system 20, such as the processing circuitry 22, may be configured to determine the direction in which the representation of the vehicle is to be translated based upon the relative location of the representation of the shadow with respect to the representation of the vehicle with the direction in which the representation of the vehicle is translated being a direction that brings the translated representation of the vehicle into the closest alignment with the representation of the shadow that is possible.

The distance that the representation of the vehicle 40, e.g., the marker 42, is translated may also be defined in various manners. In an example embodiment, the system 20, such as the processing circuitry 22, is configured to translate the representation of the vehicle toward an edge of the representation of the shadow 44 such that the outline of the translated representation of the vehicle most closely aligns with the edge of the representation of the shadow. In this example embodiment, not only is the direction of translation, but also the distance by which the representation of the vehicle is translated defined by the representation of the shadow with the direction and distance in which the representation of the vehicle is translated being defined in order to most closely align the outline of the translated representation of the vehicle with the edge of the representation of the shadow.

In order to modify the representation of the shadow 44 as noted above with respect to block 34 of FIG. 2, the system 20 of an example embodiment also includes means, such as the processing circuitry 22 or the like, for modifying the pixel values of respective pixels of the shadow to more closely align the edge of the representation of the shadow with the translated representation of the vehicle 40, e.g., the marker 42. For example, the pixel values of respective pixels of the representation of the shadow may be modified to fully align the edge of the representation of the shadow with the outline of the translated representation of the vehicle. As shown in FIG. 7, for example, following translation of the representation of the vehicle toward the edge of the representation of the shadow, the edge of the representation of the shadow is not aligned with the translated representation of the vehicle. Instead, some portions of the representation of a shadow, such as those portions of the shadow shown in right-leaning crosshatching in FIG. 7, lie outside the translated representation of the vehicle. Conversely, some portions of the translated representation of the vehicle, such as those portions 48 that are speckled in FIG. 7, lie within the representation of the shadow.

In order to more closely align the edge of the representation of the shadow 44 with the outline of the translated representation of the vehicle 40, e.g., the marker 42, those portions of the representation of the shadow that lie outside the translated representation of the building, such as those portions that have right-leaning crosshatching in FIG. 7, are modified, such as by modifying the pixel values of the respective pixels to no longer have a pixel value representative of a shadow, such as to no longer have a pixel value within the predefined range representative of a shadow. For example, in an embodiment in which a pixel value representative of a black color is representative of a shadow, the pixel values of the pixels of the representation of the shadow that lie outside the translated representation of the vehicle may be modified so as to no longer be representative of a black color, but to, instead, be representative of a white or other lighter color so as to no longer be considered a portion of the modified representation of the shadow. Similarly, those portions of the representation of the shadow that lie within the translated representation of the vehicle, such as those portions 48 that are speckled in FIG. 7, are modified, such as by modifying the pixel values of the respective pixels to have a pixel value representative of a shadow, such as to have a pixel value within the predefined range representative of a shadow. For example, in an embodiment in which a pixel value representative of a black color is representative of a shadow, the pixel values of the pixels of the representation of the shadow that lie within the translated representation of the vehicle may be modified so as to longer be representative of a white or other lighter color, but to, instead, be representative of a black color so as to now be considered a portion of the modified representation of the shadow.

Following the modification of the representation of the shadow 44, the resulting representation of the modified shadow 46 is more closely aligned with the shape of the corresponding vehicle 40, such as by being fully aligned in shape with the outline of the representation of the corresponding vehicle, e.g., the marker 42, albeit offset from the representation of the corresponding vehicle by a distance and in a direction corresponding to the distance and direction by which a shadow is cast by the vehicle, such as at the time at which the raster image of the vehicle was captured. See, for example, FIG. 8 which depicts the vehicle, the marker representative of the vehicle and the representation of the modified shadow that has a shape that more closely corresponds to the shape of the representation of the vehicle.

By way of another example, FIG. 9 depicts the image of FIGS. 3 and 4 in which the shadows 44 cast by the vehicles 40 have been modified in the manner described above with the representations of modified shadows 46 now being illustrated. By modifying the representation of the shadow, such as in the manner described above, one or more portions of representation of the shadow that generated by noise or speckle or that represented one or more objects other than the corresponding vehicle 40 have been eliminated, thereby reducing the distortion associated with the original representation of the shadow derived from the raster image. The resulting modified representation 46 of the shadow has less noise and speckle and serves as a more accurate representation of the vehicle.

Returning now to FIG. 2, the system 20 of this example embodiment also includes means, such as the processing circuitry 22 or the like, for determining a characteristic of the vehicle 40 based upon the representation of the shadow, as modified, that is associated with the vehicle. See block 36. Various characteristics of the vehicle may be determined in accordance with example embodiments. However, the system, such as the processing circuitry, of an example embodiment is configured to determine the height of the vehicle based upon the representation of the shadow, as modified, that is associated with the vehicle in relation to a shadow associated with a reference vehicle of a known height.

Although the height of a vehicle 40 may be determined based upon the shadow 44 cast by the vehicle in various manners, the system 20, such as the processing circuitry 22, of an example embodiment is configured to determine the height of the vehicle based upon the shadow cast by the vehicle in a manner illustrated by the flow chart of FIG. 10. In this example embodiment and as described above in relation to blocks 30 and 32 of FIG. 2, the system includes means, such as the processing circuitry, the communication interface 26, the user interface 28 or the like, for receiving information identifying a vehicle from a raster image and means, such as the processing circuitry or the like, for evaluating pixel values of the raster image to identify pixels having pixel values representative of a shadow associated with the vehicle. See blocks 60 and 62 of FIG. 10. The system of this example embodiment also includes means, such as the processing circuitry or the like, for determining the height of the vehicle based upon the shadow associated with the vehicle in relation to a correlation between a shadow associated with a reference vehicle and a height of a reference vehicle. See block 64.

This correlation between the shadow cast by a reference vehicle and the height of the reference vehicle may be determined in various manners, but one technique for determining the correlation is depicted in the flow chart of FIG. 11. The system 20 of this embodiment includes means, such as the processing circuitry 22 or the like, for identifying the shadow associated with the reference vehicle from an aerial image of the reference vehicle. See block 70. By way of further example, FIG. 12A depicts one example of an aerial view of a reference vehicle 40 and the shadow 44 cast by the vehicle.

A reference vehicle is a vehicle for which information regarding the shadow cast by the vehicle and the height of the vehicle have previously been determined or are able to be determined with an acceptable level of accuracy. The reference vehicle need not be the same type or class of vehicle as the vehicle that is currently undergoing analysis, such as in accordance with the process of FIG. 2, and the reference vehicle need not be of the same make, model, color, etc. of the vehicle that is currently undergoing analysis. As the shadow cast by a vehicle may differ in different geographical regions, the aerial image of the reference vehicle of an example embodiment is captured in the same geographical region as the geographical region in which the raster image of the vehicle that is currently undergoing analysis was captured. For example, an area, such as a state, a country, a county, a city or like, may be divided into a plurality of geographical regions or tiles and an image of a reference vehicle may be captured in each different geographical region in which vehicle analysis is to be conducted in accordance with the example embodiments described herein. In this example embodiment, the system 20, such as the processing circuitry 22, is configured to determine the geographical region in which the raster image from which the vehicle was identified was captured and to utilize an aerial image of a reference vehicle that was captured in the same geographical region for purposes of correlating the shadow and the height of the reference vehicle.

In another example embodiment, the aerial image of the reference vehicle that is utilized for purposes of determining the correlation is also captured at the same time or within the same period of time as the time at which the raster image of the vehicle that is currently undergoing analysis was captured. In this regard, the time may refer to the time of day, e.g., between 10 AM and 12 noon, and/or the month or season of the year, e.g., spring, as the shadows cast by a vehicle are at least partially dependent upon both the time of day and the month and/or season in which an image of the vehicle is captured. In this example embodiment, the system 20, such as the processing circuitry 22, is configured to determine the time at which the raster image from which the vehicle was identified was captured and to utilize an aerial image of a reference vehicle that was captured at the same time or within the same time period for purposes of correlating the shadow and the height of the reference vehicle.

Returning now to the identification of the shadow associated with the reference vehicle as illustrated by block 70 of FIG. 11, the shadow associated with the reference vehicle may be identified in various manners including manually based upon input provided, for example, via the user interface 28. However, the system 20, such as the processing circuitry 22, of an example embodiment is configured to identify the shadow associated with the reference vehicle by identifying the pixels of the aerial image having pixel values within a predefined range that is representative of the shadow cast by the reference vehicle. As described above in conjunction with block 32 of FIG. 2, the pixels having pixel values within the predefined range are retained and therefore serve to identify the shadow associated with the reference vehicle, while pixels having other pixel values outside the predefined range are eliminated.

In this example embodiment, the system 20 also includes means, such as the processing circuitry 22, the user interface 28 or the like, for identifying the height of the reference vehicle from a street level image of the reference vehicle. Thus, both an aerial image and a street level image of the reference vehicle are obtained as shown in FIGS. 12A and 12B with the aerial image providing information regarding the shadow cast by the reference vehicle and the street level image providing information regarding the height H of the vehicle. In this regard, the height of the reference vehicle may be identified from the street level image manually, such as based upon input provided via the user interface, or in an automated manner, such as based upon comparison of the reference vehicle and its height to an object of a predefined height that also appears within the street level image of the reference vehicle.

The system 20 of this example embodiment further includes means, such as the processing circuitry 22 or the like, for determining the correlation between the shadow associated with the reference vehicle and the height of the reference vehicle. In one example embodiment, this correlation is facilitated by the system, such as the processing circuitry, being configured to not only identify the shadow associated with the reference vehicle from the aerial image, but to also determine a width of the shadow associated with the reference vehicle, as indicated by width W in FIG. 12A. In this regard, the width of the shadow associated with the reference vehicle may be defined in a direction perpendicular to one of the longer sides of the vehicle or one of the longer sides of a representation of the vehicle, e.g., a marker.

Thus, the system 20, such as the processing circuitry 22, of this example embodiment is configured to determine the height of the vehicle based upon a width of the shadow associated with the vehicle as determined by an analysis of the raster image in relation to the correlation of the width of the shadow associated with the reference vehicle and the height of the reference vehicle. Within the relation to the correlation, the ratio of the width W of the shadow associated with the reference vehicle to the height H of the reference vehicle may be defined to be the same as the ratio of the width of the shadow associated with the vehicle from the raster image and the height of the vehicle from the raster image. As such, by determining the width of the shadow of the reference vehicle and the height of the reference vehicle along with the width of the shadow of the vehicle from the raster image, the system, such as the processing circuitry, of an example embodiment is configured to determine the height of the vehicle from the raster image such that the resulting ratios of the width of the shadow cast by the vehicle to the height of the vehicle are identical for both the vehicle from the raster image and the reference vehicle.

Based upon the height of the vehicle from the raster image, the system 20, such as the processing circuitry 22, is configured to determine one or more additional parameters associated with the vehicle. In this regard and by way of example, FIG. 13 depicts the operations performed, such as by the system of FIG. 1, in accordance with an example embodiment. In this regard and as shown in block 80, the system includes means, such as the processing circuitry or the like, for identifying the height of the vehicle based upon the representation of the shadow, as modified, associated with the vehicle, such as described above in conjunction with FIG. 10. As shown in block 82, the system of this example embodiment also includes means, such as the processing circuitry or the like, for identifying the width and the length of the vehicle based upon an image of the vehicle. For example, the system, such as the processing circuitry, may be configured to automatically determine the width and the length of the vehicle based upon an image analysis of the raster image and of the vehicle depicted therein. Alternatively, the width and the length of the vehicle may be manually input, such as via the user interface 28, and provided to the processing circuitry.

In the example embodiment of FIG. 13, the system 20 also includes means, such as the processing circuitry 22 or the like, for determining a volume of the vehicle based upon a product of the height, width and length of the vehicle. See block 84. The system of this example embodiment may also include means, such as the processing circuitry or the like, for determining the type of vehicle based upon one or more of the height, width, length or volume of the vehicle. See block 86. For example, the type of vehicle may be determined based upon the volume of the vehicle that has been determined as the product of the height, width and length of the vehicle. In this regard, the type of vehicle generally refers to the class of vehicle such as a bus, a truck, an automobile, a motorcycle, etc. Each type of vehicle may be associated with a range of volumes such that the system, such as the processing circuitry, may be configured to determine the type of vehicle based upon the range of volumes associated with the different types of vehicles within which the volume of the vehicle falls. As shown in block 88 of FIG. 11, the system of this example embodiment also includes means, such as the processing circuitry or the like, for determining the weight of the vehicle based upon the type of vehicle. Although the weight of the vehicle may be determined in various manners, the system, such as the processing circuitry, of an example embodiment is configured to associate each different type of vehicle with a different predefined weight. As such, the weight of the vehicle is determined to be equal to the weight associated with the type of vehicle that has been identified from the raster image.

Based upon the characteristic of the vehicle that is determined from analysis of the raster image, various applications, such as navigational applications, may be enhanced. For example, with respect to the vehicle as identified in the raster image, the system 20 of an example embodiment includes means, such as the processing circuitry 22 or the like, for determining a navigational route for the vehicle based at least in part upon the characteristic of the vehicle. For example, certain road segments may have limits on the weight and/or height of the vehicles that may travel along those road segments. As such, the system, such as the processing circuitry, of an example embodiment is configured to determine a navigational route for the vehicle such that the height and weight of the vehicle satisfy the requirements associated with the road segments that are included in the route. Additionally, some road segments and/or some lanes of road segments may limit the types of vehicles that may travel thereover. Thus, the system, such as the processing circuitry, of this example embodiment is configured to determine the route such that the vehicle satisfies all requirements as to the type of vehicles that can travel thereover in relation to the road segments that comprise the route.

As further examples in relation to applications that utilize information regarding the characteristics of a plurality of vehicles in a more aggregated manner, information regarding the characteristics of the vehicles, such as the types of vehicles, the weights of the vehicles, the heights of the vehicles, etc., that are identified to travel along different road segments may be provided to the authorities responsible for the design, construction and/or maintenance of the road network. Based upon the types of vehicles, the weights of the vehicles and/or the heights of the vehicles that travel along the different road segments, the road network may be designed, constructed and maintained in a manner that is consistent with and supports the vehicles that travel thereover.

As described above, a method, system 20 and computer program product are provided in order to analyze an image of a vehicle to determine a characteristic of the vehicle, such as may be represented by or otherwise at least partially defined by the shadow cast by the vehicle, in a manner that is accurate and efficient. In this regard, the method, system and computer program product of an example embodiment may rely upon raster imagery so as to conserve processing resources and be more computational efficient than in an instance in which high resolution imagery is utilized. However, the method, system and computer program product of an example embodiment process the raster imagery, such as by refining the shadow cast by a vehicle present in the raster imagery, in a manner that improves the accuracy of the resulting shadow, such that characteristics of the vehicle that are dependent upon the shadow cast by the vehicle can be determined with more accuracy and reliability.

As described above, FIGS. 2, 5, 10, 11 and 13 illustrate flowcharts of a map generation system 20, method, and computer program product according to example embodiments of the invention. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the map generation system and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A vehicle analysis system comprising processing circuitry and at least one memory including computer program code, the at least one memory and computer program code configured to, with the processing circuitry, cause the vehicle analysis system to at least:

receive information identifying a vehicle from a raster image;

evaluate pixel values of the raster image to identify pixels having pixel values representative of a shadow associated with the vehicle;

modify a representation of the shadow by modifying the pixel values of the pixels based upon a shape of the vehicle such that the representation of the shadow, as modified, has a shape corresponding to the shape of the vehicle; and determine a characteristic of the vehicle based upon the representation of the shadow, as modified, that is associated with the vehicle.

2. A vehicle analysis system according to claim 1 wherein the at least one memory and the computer program code are configured to, with the processing circuitry, cause the vehicle analysis system to modify the representation of the shadow by:
  translating a representation of the vehicle toward an edge of the representation of the shadow; and
  modifying the pixel values of respective pixels of the shadow to more closely align the edge of the representation of the shadow with the translated representation of the vehicle.

3. A vehicle analysis system according to claim 1 wherein the at least one memory and the computer program code are configured to, with the processing circuitry, cause the vehicle analysis system to modify the representation of the shadow by modifying the pixel values of respective pixels based upon a shape of the vehicle such that the representation of the shadow, as modified, has an identical shape to the shape of the vehicle.

4. A vehicle analysis system according to claim 1 wherein the at least one memory and the computer program code are configured to, with the processing circuitry, cause the vehicle analysis system to determine the characteristic of the vehicle by determining a height of the vehicle based upon the representation of the shadow, as modified, that is associated with the vehicle in relation to a shadow associated with a reference vehicle of a known height.

5. A vehicle analysis system according to claim 4 wherein the at least one memory and the computer program code are further configured to, with the processing circuitry, cause the vehicle analysis system to determine the characteristic of the vehicle by determining a width and a length of the vehicle based upon the raster image of the vehicle and determining a volume of the vehicle based upon a product of the height, width and length of the vehicle.

6. A vehicle analysis system according to claim 5 wherein the at least one memory and the computer program code are further configured to, with the processing circuitry, cause the vehicle analysis system to determine the characteristic of the vehicle by determining a type of vehicle based upon one or more of the height, width, length or volume of the vehicle.

7. A vehicle analysis system according to claim 6 wherein the at least one memory and the computer program code are further configured to, with the processing circuitry, cause the vehicle analysis system to determine the characteristic of the vehicle by determining a weight of the vehicle based upon the type of vehicle.

8. A vehicle analysis system according to claim 1 wherein the at least one memory and the computer program code are further configured to, with the processing circuitry, cause the vehicle analysis system to determine a navigational route for the vehicle based at least in part upon the characteristic of the vehicle.

9. A method for analyzing an image of a vehicle, the method comprising:
  receiving information identifying a vehicle from a raster image;
  evaluating pixel values of the raster image to identify pixels having pixel values representative of a shadow associated with the vehicle;
  modifying a representation of the shadow by modifying the pixel values of the pixels based upon a shape of the vehicle such that the representation of the shadow, as modified, has a shape corresponding to the shape of the vehicle; and
  determining a characteristic of the vehicle based upon the representation of the shadow, as modified, that is associated with the vehicle.

10. A method according to claim 9 wherein modifying the representation of the shadow comprises:
  translating a representation of the vehicle toward an edge of the representation of the shadow; and
  modifying the pixel values of respective pixels of the shadow to more closely align the edge of the representation of the shadow with the translated representation of the vehicle.

11. A method according to claim 9 wherein modifying the representation of the shadow comprises modifying the pixel values of respective pixels based upon a shape of the vehicle such that the representation of the shadow, as modified, has an identical shape to the shape of the vehicle.

12. A method according to claim 9 wherein determining the characteristic of the vehicle comprises determining a height of the vehicle based upon the representation of the shadow, as modified, that is associated with the vehicle in relation to a shadow associated with a reference vehicle of a known height.

13. A method according to claim 12 wherein determining the characteristic of the vehicle further comprises determining a width and a length of the vehicle based upon the raster image of the vehicle and determining a volume of the vehicle based upon a product of the height, width and length of the vehicle.

14. A method according to claim 13 wherein determining the characteristic of the vehicle further comprises determining a type of vehicle based upon one or more of the height, width, length or volume of the vehicle.

15. A method according to claim 14 wherein determining the characteristic of the vehicle further comprises determining a weight of the vehicle based upon the type of vehicle.

16. A method according to claim 9 further comprising determining a navigational route for the vehicle based at least in part upon the characteristic of the vehicle.

17. A system configured to determine a height of a vehicle based upon a shadow cast by the vehicle, the system comprising processing circuitry and at least one memory including computer program code, the at least one memory and computer program code configured to, with the processing circuitry, cause the system to at least:
  receive information identifying a vehicle from a raster image;
  evaluate pixel values of the raster image to identify pixels having pixel values representative of a shadow associated with the vehicle; and
  determine the height of the vehicle based upon the shadow associated with the vehicle in relation to a correlation between a shadow associated with a reference vehicle and a height of the reference vehicle.

18. A system according to claim 17 wherein the at least one memory and computer program code are further configured to, with the processing circuitry, cause the system to:
  identify the shadow associated with the reference vehicle from an aerial image of the reference vehicle;
  identify the height of the reference vehicle from a street level image of the reference vehicle; and
  determine the correlation between the shadow associated with the reference vehicle and the height of the reference vehicle.

19. A system according to claim 18 wherein the raster image of the vehicle is captured while the vehicle is within a geographical region, and wherein the aerial image of the reference vehicle is captured while the reference vehicle is within the same geographical region.

20. A system according to claim 18 wherein the at least one memory and computer program code are configured to, with the processing circuitry, cause the system to identify the shadow associated with the reference vehicle by determining a width of the shadow associated with the reference vehicle, and wherein the at least one memory and computer program code are configured to, with the processing circuitry, cause the system to determine the height of the vehicle by determining the height of the vehicle based upon a width of the shadow associated with the vehicle in relation to the correlation between the width of the shadow associated with the reference vehicle and the height of the reference vehicle.

* * * * *